(12) United States Patent
Dunn

(10) Patent No.: US 6,538,569 B1
(45) Date of Patent: Mar. 25, 2003

(54) CONTAINER WITH SENSOR

(75) Inventor: William Frank Dunn, Stow, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/786,513

(22) PCT Filed: Oct. 30, 1998

(86) PCT No.: PCT/US98/23101

§ 371 (c)(1),
(2), (4) Date: Mar. 1, 2001

(87) PCT Pub. No.: WO00/26884

PCT Pub. Date: May 11, 2000

(51) Int. Cl.[7] .............................................. G08B 21/00
(52) U.S. Cl. ............. 340/540; 340/825.06; 340/870.17; 340/572.1; 340/572.7; 340/572.9
(58) Field of Search ........................... 340/825.06, 540, 340/870.17, 572.1, 568.1, 572.7, 572.8, 572.9, 603, 572.4

(56) References Cited

U.S. PATENT DOCUMENTS

| 4,876,535 A | * | 10/1989 | Ballmer et al. ........ 340/825.34 |
| 5,150,058 A | * | 9/1992 | Johnson ..................... 324/519 |
| 5,181,975 A | | 1/1993 | Pollack et al. ............ 152/152.1 |
| 5,641,634 A | * | 6/1997 | Mandecki ............... 340/825.06 |
| 5,767,775 A | * | 6/1998 | Shukla et al. ................ 340/623 |
| 5,798,694 A | | 8/1998 | Reber et al. ................. 340/540 |
| 5,847,447 A | * | 12/1998 | Rozin et al. .................. 257/678 |
| 6,157,190 A | * | 12/2000 | Nagaishi et al. ............. 324/242 |

FOREIGN PATENT DOCUMENTS

| EP | 0312168 | | 4/1989 | ............ G06K/7/08 |
| EP | 0812752 | * | 5/1990 | |
| EP | 0702316 | * | 3/1996 | |
| EP | 0812752 | | 12/1997 | ........... B61L/25/04 |
| WO | 9107736 | | 5/1991 | ........... G08C/19/12 |
| WO | wo 94/27117 | * | 11/1994 | |
| WO | 9427117 | | 11/1994 | ............ G01D/5/48 |
| WO | 9515622 | | 6/1995 | ............ H04B/5/02 |

* cited by examiner

Primary Examiner—Daniel J. Wu
Assistant Examiner—Daniel Previl
(74) Attorney, Agent, or Firm—David E Wheeler; Richard B O'Planick

(57) ABSTRACT

A sealed container is provided with a sensor capable of monitoring the physical and/or chemical condition of materials stored in the container. The sensor may or may not have its own power source. In the embodiment where the sensor does not have a power source, a communicator induces a signal in the sensor and receives a return signal with the desired data. The container may be a metal or a nonmetal.

13 Claims, 7 Drawing Sheets

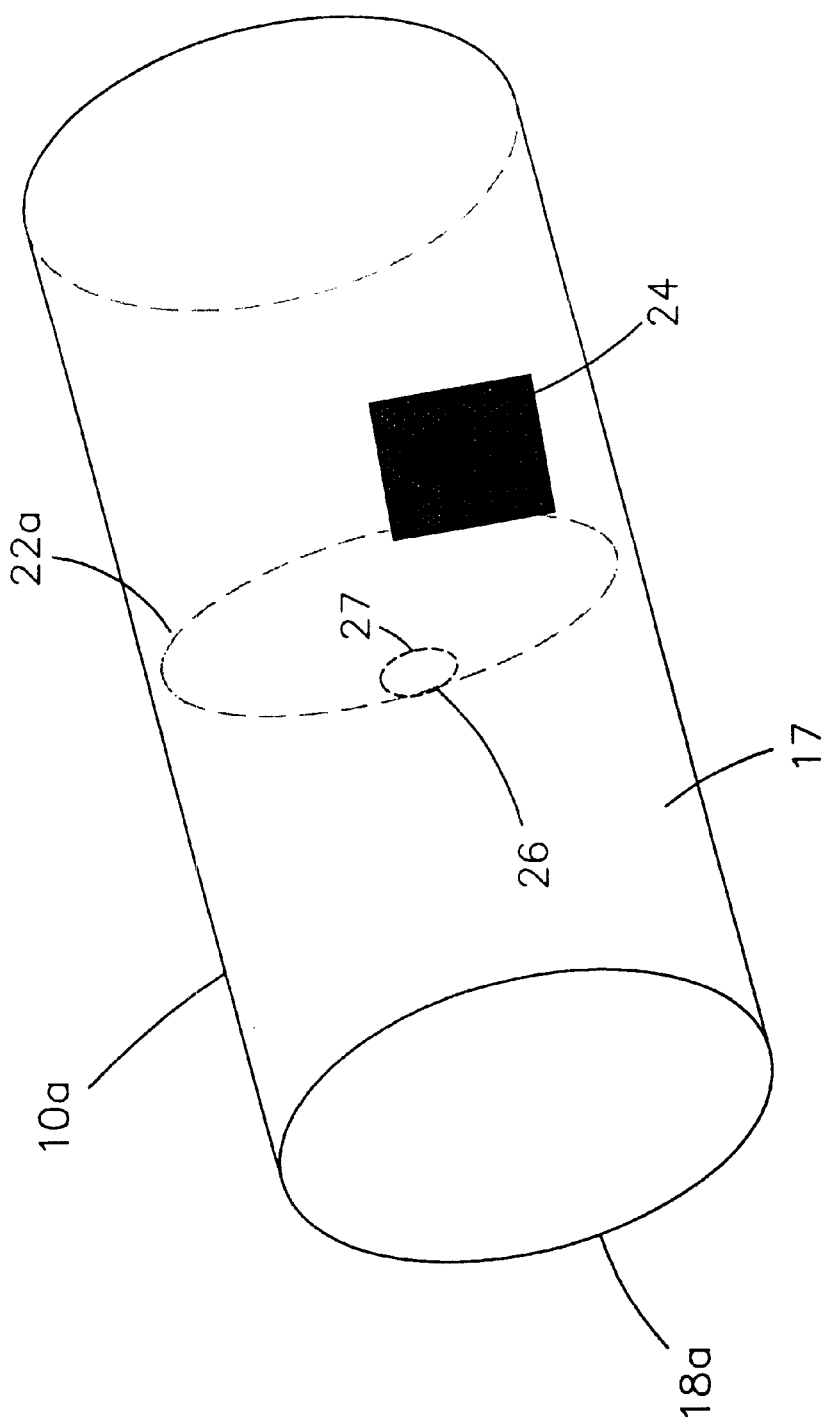

CONTAINER WITH SENSOR

TECHNICAL FIELD

The present invention relates to a method and apparatus for monitoring stored chemicals.

BACKGROUND OF THE INVENTION

It is sometimes necessary to store chemical compositions that are sensitive to heat, moisture, and pressure, as well as chemicals that are volatile or subject to degradation, for long periods of time. The physical or chemical condition of the chemicals can be monitored by testing samples of the chemical, but such sampling is time consuming, wastes materials, and is sometimes risky.

Nevertheless, for quality assurance, safety, and other reasons, it is important to know when chemicals, such as fertilizers, rocket fuels, and explosives, are or have been overheated, decomposed, contain too much moisture, or are subjected to other undesirable conditions. In some instances, it is not practical to break open the containers and sample the chemicals to determine their condition.

Accordingly, it is a goal of this invention to create a method and apparatus for quickly and accurately determining the condition of a chemical composition while the chemical composition is in a sealed container.

Other objects of the invention will be apparent from the following description and claims.

DESCRIPTION OF THE PRIOR ART

Systems for monitoring vehicle tire pressure and the like have been proposed wherein a transmitter and a receiver are mounted on a vehicle body, and magnetically coupled inductor and enhancer circuits are carried on the vehicle wheel to provide monitoring a vehicle tire pressure, as described by Allen in U.S. Pat. No. 4,588,978. Other devices to monitor tire pressure have been proposed by Galasko et al., in U.S. Pat. No. 4,578,992, who teach a coil mounted in a tire which forms, with a capacitor, a passive oscillatory circuit. The circuit is energized by pulses supplied via a coil positioned outside the tire and secured to the vehicle, and the frequency in the passive oscillatory circuit is varied with tire pressure due to changes caused to the capacitance value of the capacitor. The frequency in the circuit is sensed by a coil positioned outside the tire and secured to the vehicle.

Milheiser, in U.S. Pat. No. 4,730,188, teaches the use of a passive integrated transponder which is attached to or imbedded in an item to be identified, and is excited by an inductive coupling from an interrogator.

Fiorletta, in U.S. Pat. No. 5,289,160, teaches a wireless tire pressure monitoring system European Patent Application (EPA) 0312168 teaches a method and apparatus for electronically identifying articles moving along a surface, especially where the surface and/or articles comprise conductive material. The article is fitted with electronic responders, and the surface is provided with electrodes of a transceiver device. When the responders are located opposite the electrodes, a signal is sent.

EPA 0812,752 relates to an electromagnetic transmission and detection system comprising a transmission coil for producing a high intensity magnetic field, and first and second receiving coils for receiving a low intensity magnetic field from an inductively powered transponder. A ferrite rod is used to resonate the same operating frequency so that the energy transferred between the transmitter and the transponder is maximized.

PCT application WO91/07736 teaches a high temperature monitor that can be used near conductive objects that produces unwanted reflected impedance, and can be used to monitor the temperature within soup cans, and the like.

PCT application WO04/27117 teaches a security system which uses a container that has sensors for predetermined physical stimuli, for example a pressure sensor. The container contains a transponder for transmitting data from the sensor without opening the container.

DISCLOSURE OF INVENTION

A method of monitoring physical parameters of a composition enclosed in a container comprises the steps of (a) embedding a id-tag/sensor (transponder) in a composition wherein the sensor is capable of measuring physical parameters of the composition, (b) enclosing the composition in a container, (c) winding an antenna around the container in the proximity of the sensor, (d) bringing a communication means into proximity to the antenna, and (e) activating the sensor through the antenna using the communication means, and receiving and recording a response from the sensor using the communication means.

A ferrite core may be associated with the sensor for amplifying signals to and from the sensor.

Further, the physical parameters measured may be selected from the group comprising-pressure data, temperature data, moisture content data, chemical data and mixtures thereof.

The sensor may be enclosed in a loop of wire, wherein the sensor is electrically coupled with the wire to form a coupled sensor, a second wire may be placed adjacent to the is coupled sensor, and an antenna may be placed adjacent to the second wire.

In an alternative embodiment, the method may comprise the steps of (a) embedding an E-field sensor in a chemical composition, the E-field sensor being capable of measuring physical parmeters of said chemical composition, (b) enclosing the composition in a container, (c) placing an E-field antenna at opposed sides of the container, (d) creating an E-field in the antenna using an E-field driver to induce a signal in and receive a signal from the sensor, (d) bringing an E-field reader into proximity to the antenna, and (e) receiving and recording a response from the sensor.

In the methods, the receiving antenna may be placed inside or outside the container, it being important only that the receiving antenna be in close proximity to the transponder.

Also provided is a container for containing a chemical composition, the container comprising (a) impenetrable materials completely enclosing an interior space and having an inside and an outside, (b) an id-tag/sensor disposed inside the container, the id-tag/sensor being capable of retaining identification information and measuring physical or chemical parameters of the interior space, and an antenna associated with the sensor.

The antenna may comprise at least two loops of wire, a first wire being disposed in the proximity of the impenetrable material of the container and the sensor, and a second wire being disposed around the container. The first wire may be inside or outside the container. The first wire is used as a receiving antenna and the second wire is used as a transmitting antenna for the id-tag/sensor, and the id-tag/sensor is activated by communication means associated with the transmitting antenna.

The sensor may be a ferrite core pressure and temperature sensor having id information associated therewith, and the impenetrable material of the container may be a metal or a nonmetal.

In an alternative embodiment, the sensor may be in proximity to and coupled to a loop of wire disposed in the proximity of the impenetrable material of the container, and the loop of wire may be inductively associated with an antenna outside the container.

In another alternative embodiment of the container, the id-tag/sensor may comprise a chip sandwiched between an upper electrode and a ground electrode wherein the sensor is activated by at least two E-field plates at opposed sides of the id-tag/sensor. A first E-field plate may comprise a metal core in the interior of the container, and a second E-field plate may comprise the impenetrable material of the container. Alternatively, a first E-field plate may comprise a flat metal upper plate disposed on -a first side of the container, and a second E-field plate may comprise a flat metal ground plate disposed on a second, opposed side of the container.

BRIEF DESCRIPTION OF DRAWINGS

FIG. 2a illustrates a container having a sensor inductively coupled with a loop of wire outside the container which is further coupled with an exterior antenna.

DETAILED DESCRIPTION OF THE INVENTION

In the art relating to the gathering of information from an animate or dynamic objects, the trend has been toward implanting a device which is capable of transmitting information and is responsive to an outside power source. This is accomplished by including a coil (which is capable of carrying an induced electrical current) of some sort in the implanted device. An electrical current can be induced in the coil by a magnetic field produced by an interrogator as the lines of flux from the magnetic field cut across the coil. The current produced in the coil, in turn, produces a magnetic field which can be read by the interrogator. The current in the coil, and the signal read by the interrogator, can be altered by electrical devices used to provide tire data, such as temperature and pressure sensors, and these differences in the signal can be read and interpreted by the interrogator.

A transponder used in the invention may be similar to that illustrated in U.S. Pat. No. 5,181,975 (applcation Ser. No. 676153) and U.S. Pat. No. 5,218,861 (application Ser. No. 676121), assigned to The Goodyear Tire and Rubber Company, and commonly assigned application. Ser. Nos. PCT/97/22570, PCT/97/22571, and PCT/97/22463, and may provide identification data, and may be used to monitor pressure, the temperature, the chemical composition of the container and the like.

The transponder or signal generator means may comprise a chip and conducting wires which are used to receive a signal from a communicator and to transmit data in response to the communicator signal.

An antenna may be provided, in the illustrated embodiment, in one or more turns of conductor wire. Although a sufficient signal may be obtained with one turn of wire, the signal is boosted as additional turns are added since the amount of current developed is dependent on the number of lines of magnetic flux encountered by the antenna in accordance with the ampere law.

Three different wires, for example, can be used to obtain three turns of antenna wire.

Figure 1:
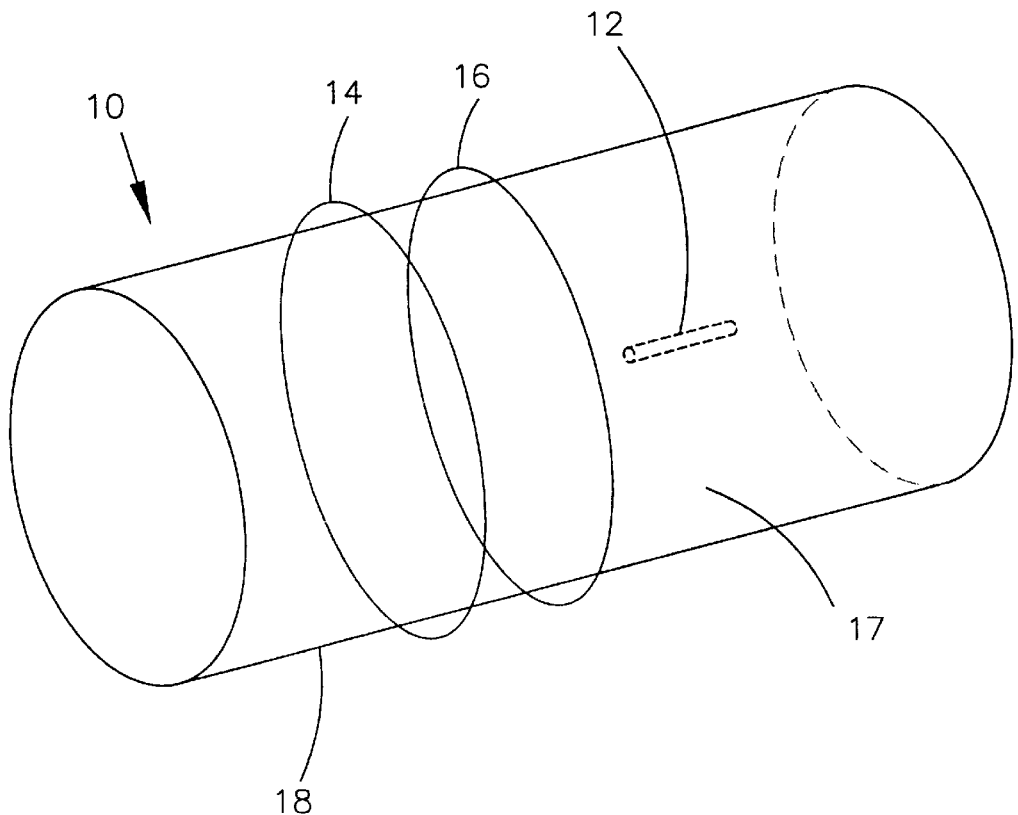
FIG. 1 illustrates antenna wire surrounding a container which has an id-tag/sensor inside.

With reference now to FIG. 1, a container 10 of the invention is illustrated as having a cylindrical shape. Although other shapes are possible for containers of the invention, cylindrical shape may be representative of rockets, artillery shells, and drums of fertilzer, which are used as examples of containers which are embodied by the present invention.

In FIG. 1, at least one antenna wire (two antenna wires 14 and 16 are illustrated) are exterior (outside) of the material 18 comprising the container. A transponder 12 comprising a ferrite core passive sensor (PST) is located in the interior of the container (inside), in close physical contact with the material 17 stored in the container, i.e., within the substance that is monitored.

The material 18 of the container is impenetrable, i.e., it is capable of holding or containing the material for which it is designed for a substantially indefinite period of time under normal conditions. By normal conditions it is meant that the container is not subjected to significant outside stimuli. Non-limiting examples of container material may include cardboard, fiberglass, paper, metal and glass.

Figure 1A:
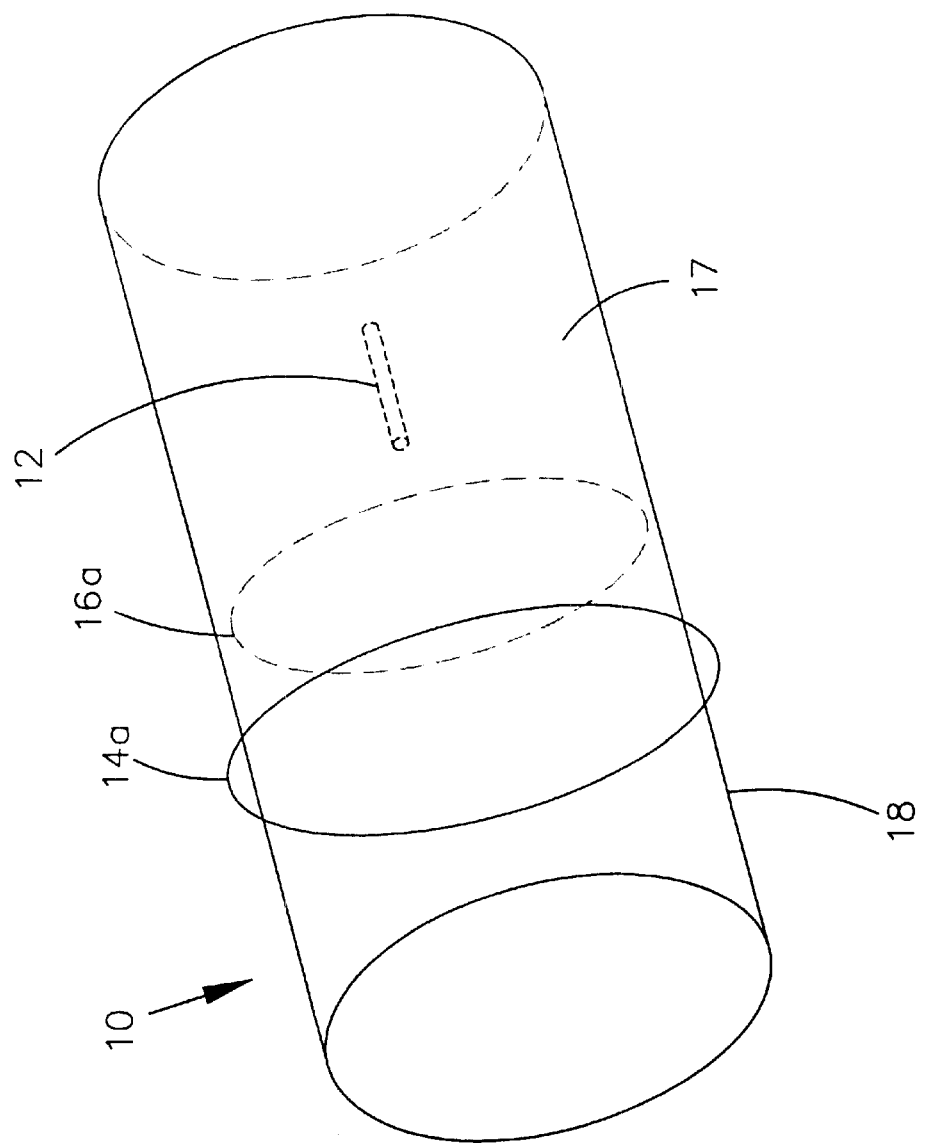
FIG. 1a illustrates an alternative configuration of FIG. 1 wherein at least one antenna wire is inside the container.

With reference now to FIG. 1a, in an alternative embodiment, at least one antenna wire 14a is outside container 10 and at least one antenna wire 16a is inside container 10.

In FIGS. 1 and 1a, the at least one antenna wire 14,14a is used as a transmitting antenna for transponder 12 and the at least one antenna wire 16,16a is used as a receiving antenna for transponder 12.

As illustrated, receiving antenna wire 16,16a must be in close proximity to transponder 12, but transmitting antenna wire 14,14a may be remote from transponder 12. For example, receiving antenna 16 may be disposed in close proximity to the skin of a rocket, either inside or outside the skin of the rocket, and the transmitting antenna 14,14a may be disposed around the rocket's container or silo. When a communicator, such as an interrogator, sets up a signal in the transmitting antenna, the signal is boosted and then picked up by the receiving antenna, through which the transponder is activated.

In some embodiments of the invention, the transponder may be conductively connected to the antenna wire in the manner disclosed in the copending PCT applications mentioned above. For most applications, however, it is preferred that the transponder be free of the antenna wire and be designed to be activated by an inductive signal through the antenna.

Although an interrogator, as described in the patents and applications cited herein, may be used to induce a signal in the transponder, for many applications it will be more convenient to conductively connect a communicator (not shown) to the antenna through leads. The communicator can then be used to transfer an electrical current directly to the antenna, as opposed to inducing such a current when an interrogator is used. The signals may be generated in the same manner as described for an interrogator.

The communicator may be powered by a battery or an alternating current (AC) or direct current (DC) generator. Those skilled in the art will know how to generate, receive and process signals generated by any power source.

Since metals dissipate some signals, for best results, container material 18 in the illustrated embodiments of FIGS. 1 and 1a should be a nonmetal.

Figure 2:
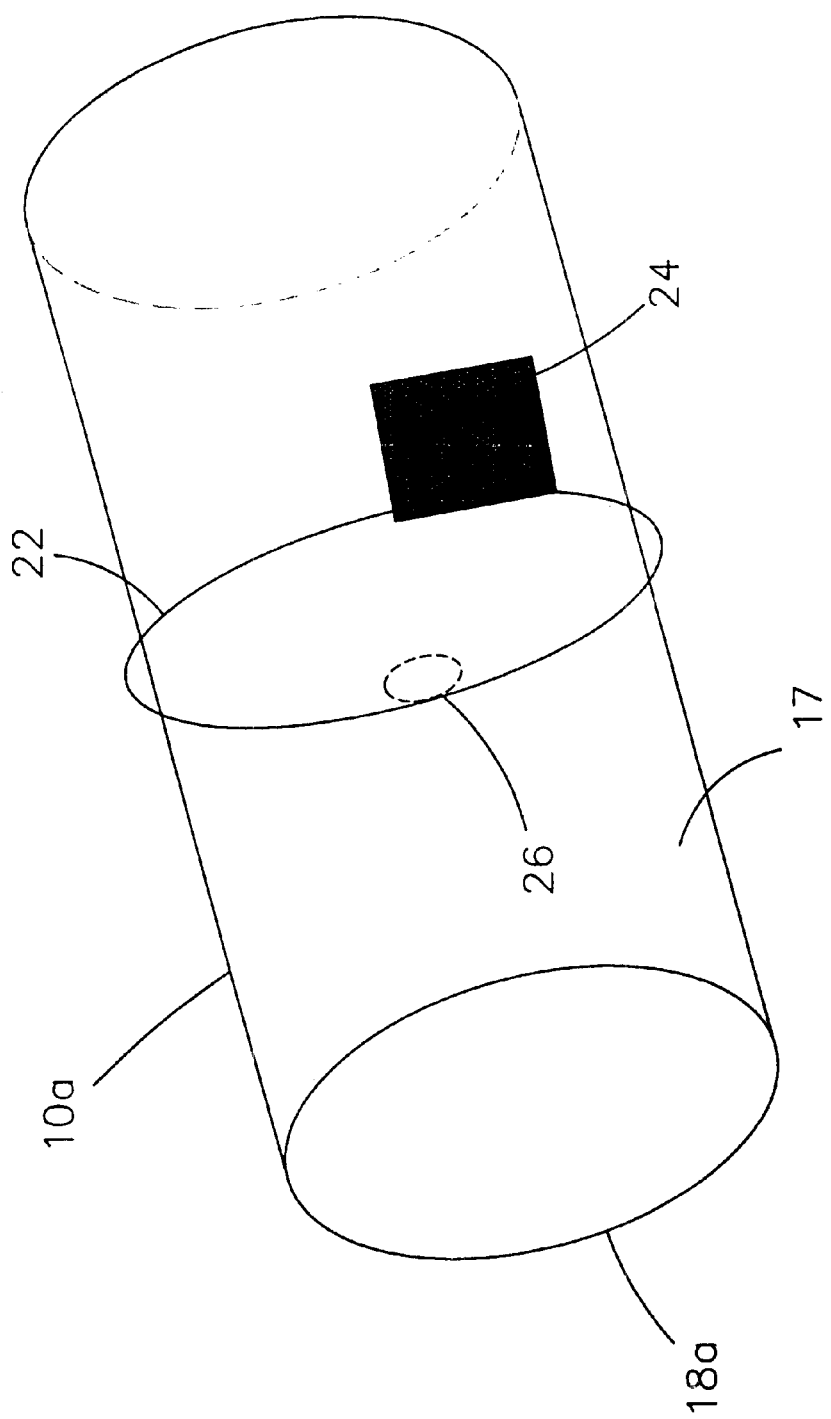
FIG. 2 illustrates a container having a sensor inductively coupled with a loop of wire inside the container which is further coupled with an exterior antenna.

In an alternative embodiment of the invention, as illustrated in FIGS. 2 and 2a, the transponder 26, with the desired sensors, may be inductively coupled to an antenna wire 22,22a which may be either inside or outside the container 10a. In such an embodiment, the transmitting antenna 24 is, similar to the embodiment shown in FIGS. 1 and 1a, remote from transponder 26.

Although antenna 24 is illustrated as a woven wire grid, those skilled in the art will recognize that antenna 24 may be in any suitable form for inducing a signal in receiving antenna 22,22a and picking up a return signal therefrom.

As was the case in the embodiment of FIGS. 1 and 1a, for best results the material 18a of container 10a will preferably be a nonmetal.

In a further alternative embodiment, data signals may be provided by an E-field generator.

Figure 3:
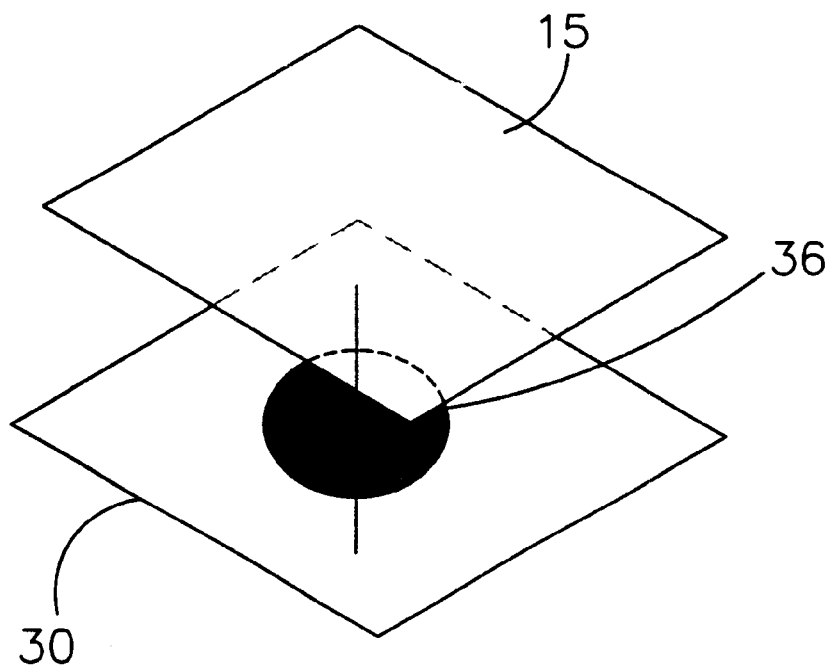
FIGS. 3 and 3a illustrate, respectively, a perspective view and a side view of a chip sandwiched between an upper electrode and a ground electrode.
Figure 3A:
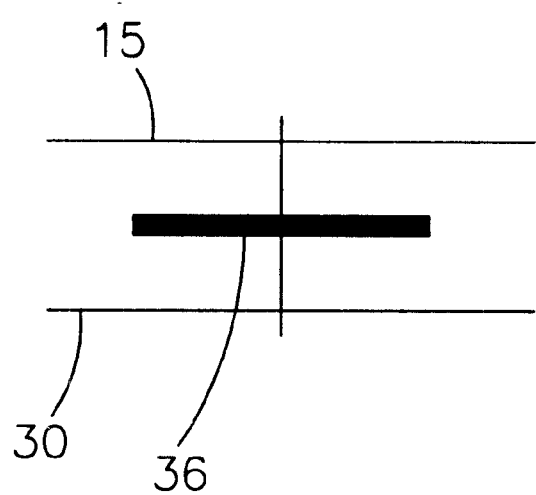

When an E-field application is used, a transponder 36 is sandwiched between an upper electrode 15 and a ground electrode 30, as illustrated in FIGS. 3 and 3a, and capacitance between the upper electrode 15 and ground electrode 30 activates a signal from transponder 36.

Figure 4:
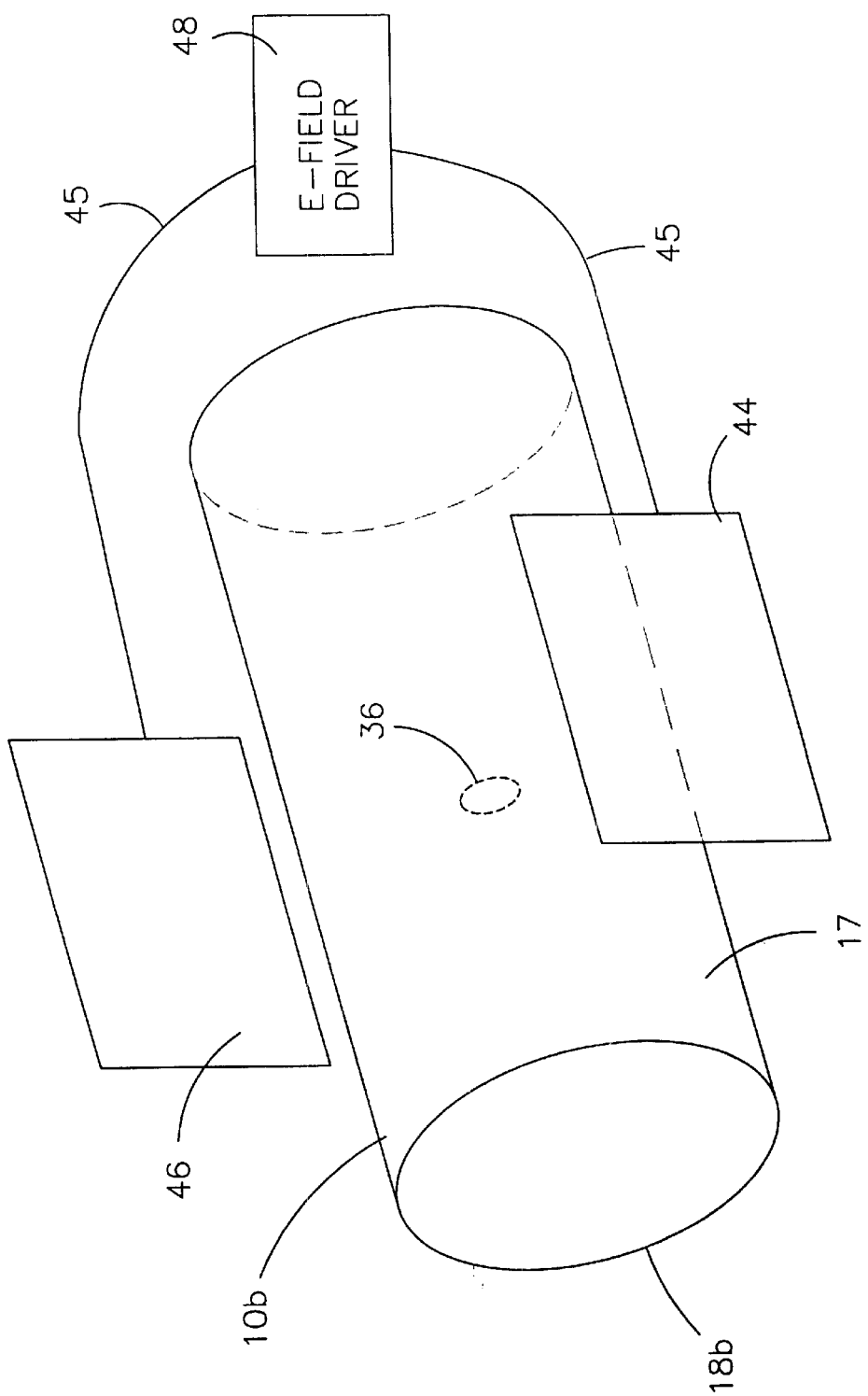
FIG. 4 illustrates a container wherein a sensor is enclosed inside, and plates capable of creating an E-field are disposed at sides of the container.

As further illustrated in FIG. 4, an E-field is induced in upper plate 15 by a charge created in charge plate 46 by E-field driver 48. Conductor 45 connects E-field driver 48 with charge plate 46 and ground plate 44.

As in the earlier embodiments, for best results, it is preferred that container material 18b of container 10b be a nonmetal.

Figure 5:
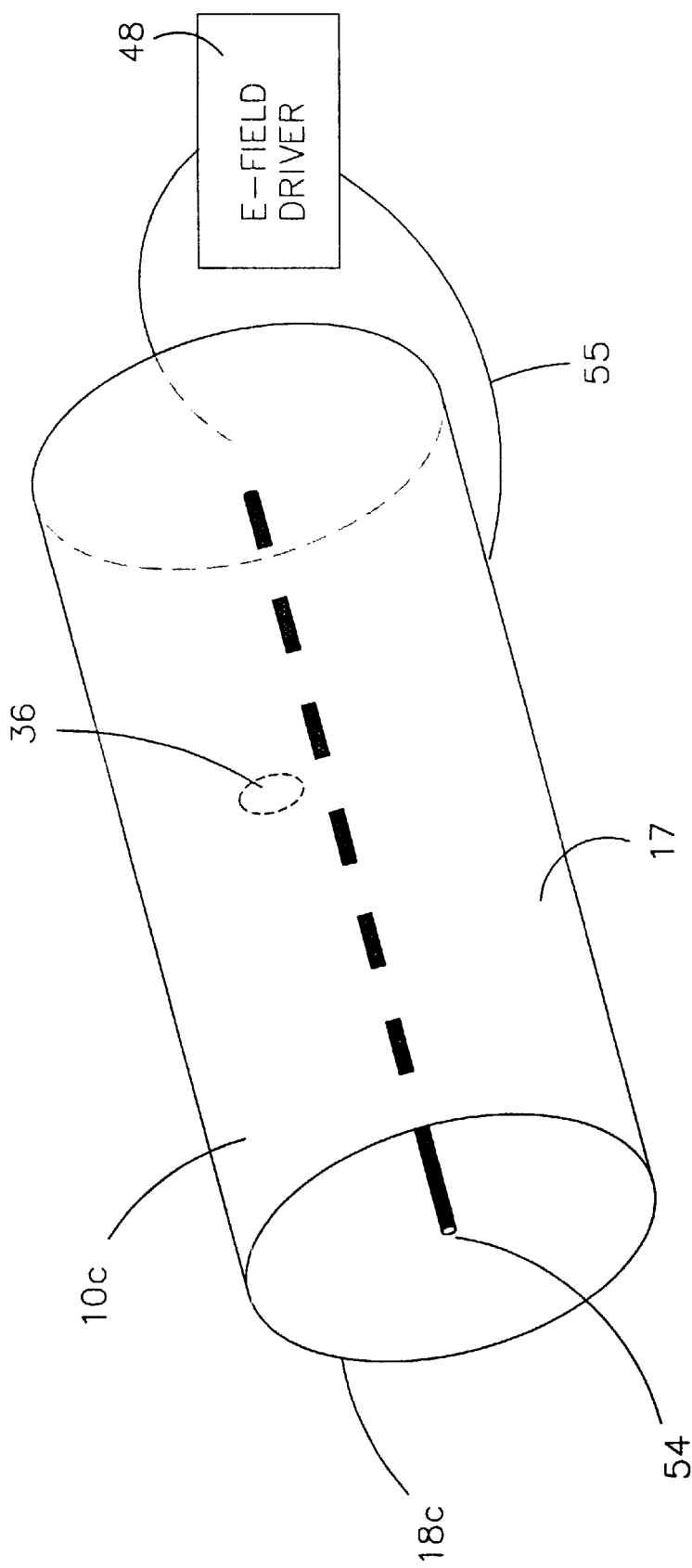
FIG. 5 illustrates a container wherein a metal core in the container and the container material are capable of creating an E-field.

With reference now to FIG. 5, in an alternative use of an E-field driver, a metal core 54 may be provided in the center of container 18c to act as a charge plate when connected to E-field driver 48 through conductor 55. In such an embodiment, the material 18c of the container may be a metal, and the material 18c may act as the ground plate for the E-field driver when connected to E-field driver 48 through conductor 55.

One of the primary uses for the apparatus of the invention is to provide data on the history as well as the present condition of the chemical composition. It is important to know if the chemical composition has encountered excessively high temperatures. The chip in transponder 12, 36, can be provided with means to collect pressure and temperature data and to receive information on the current condition of the chemical composition, to be retained along with identification data.

In the illustrated embodiment, transponder 12,36 may be activated by a communicator that transmits at a specific radio frequency and the chip responds by stepping down the radio signal to transmit one-half the radio frequency in a return signal. The radio frequency is heterodyned against the return signal frequency producing a difference side band to reinforce the return signal response.

In the illustrated embodiment, the temperature reading is obtained by counting and entering into memory of the communicator the number of cycles output from an oscillator, the frequency of which is proportional to temperature. The temperature can be read by converting a voltage signal to a digital display, where there is a band gap voltage shift with a change in temperature.

Alternatively, a temperature can be read by a switch which is operated by the linear thermal expansion of the materials from which it is constructed. The switch is designed to change signals, i.e. from the binary 0 to 1 for example, when the maximum designated temperature is exceeded. The switch cannot be reset, and a change in the binary signal of the switch indicates that the container has been thermally compromised.

In the illustrated embodiment, the pressure sensor provides real time information, that is the pressure in the container at the time of the reading.

In the illustrated embodiment the pressure sensor provides a capacitance measurement which is directly related to the pressure. In the pressure sensor, a highly doped silicon electrode having a thin flexible diaphragm micromachined (etched) into its center, is placed over an electrically conductive substrate, and the distance of separation of the flexible diaphragm from the substrate controls the resulting capacitance. Silicon dioxide is used as an electrical insulator, preventing shorting between the substrate and the electrode. The surface area of the oxide coating and its distance of separation from the substrate controls the capacitance reading. Accordingly, as the pressure increases, the distance of separation between the silicon and substrate electrodes decreases, and the capacitance changes, and a measurement of the capacitance can be digitally converted to a pressure reading in pounds per square inch, or other dimensions as required. Silicon rubber or polyurethane rubber can be used to fill the void above the flexible diaphragm to serve as a pressure-coupling medium between the chemical composition and the measuring diaphragm. The capacitance measured is in the picofarad (pf) region, and the communicator can be pre-programmed to convert the picofarad (pf) measurements to pounds per square inch.

In the illustrated embodiment, the real time temperature sensor is a band gap reference diode which is part of the integrated circuit. An alternative temperature sensor may comprise a bimetallic latching sensor, for example a gold/chromium alloy (Au/Cr) on a silicon (Si) substrate.

Those skilled in the art will recognize that sensors and containers of the invention can take many different forms. For example, the container may be a concrete pillar, as for a bridge or high rise building, and the sensor can take the form of a stain gauge, whereby stresses on the structure of the pillar can be monitored. from the spirit of the invention. The scope of the invention is limited only by the following claims.

What is claimed is:

1. A method of monitoring physical parameters of a composition (17) enclosed in a container (10,10a,10b,10c) comprising the steps of a. embedding in a composition (17) a sensor (12,26,36) capable of measuring physical parameters of said composition b. enclosing said composition (17) in a container (10, 10a,10b,10c)

c. winding an antenna (14,14a,16,16a,22,22a,24) around said container 910,10a,10b,10c) in the proximity of said sensor (12,26,36)

d. bringing a communication means into proximity with said antenna (14,14a,16, 16a, 22, 22a ) and e. activating said sensor (12,26,36) through said antenna (14,14a,16,16a,22,22a) (using said communication means and receiving and recording a response from said sensor (12,26,36) using said communication means.

2. The method of claim 1 comprising the further step of associating a ferrite core with said antenna for amplifying signals to and from said sensor.

3. The method of claim 1 comprising the further step of selecting said physical parameters from the group comprising pressure data, chemical data, temperature data, moisture content data and mixtures thereof.

4. The method of claim 1 comprising the further steps of enclosing said sensor (26) in a loop of wire (27), wherein said sensor (26) is electrically coupled with said wire (27) to form a coupled sensor, placing a second wire (22,22a) adjacent to said coupled sensor, and placing an antenna (24) adjacent said second wire (22,22a).

5. The method of claim 1 comprising the further steps of sandwiching said sensor (36) between an upper electrode (15) and a lower electrode (30).

6. A method of monitoring physical parameters of a chemical composition (17) enclosed in a container (10) comprising the steps of (a) embedding in a chemical composition (17) an electric field (E-field) sensor (36) capable of measuring physical parameters of said chemical composition (17)

(b) enclosing said composition in a container (10b,10c)

(c) placing E-field plates (44,46) at opposed sides of said container (10b,10c)

(d) creating an E-field in said plate (44,46) using an E-field driver (48) to induce a signal in and receive a signal from said sensor (36)

(e) bringing an E-field reader into proximity to said plate (44,46), and (f) receiving and recording a response from said sensor (36).

7. A container (10,10a,10b,10c) for containing a chemical composition (17), said container being made of impenetrable materials (18,18a,18b,18c) said impenetrable materials completely enclosing an interior space and having an inside and an outside, said container having an id-tag/sensor (12,26,36) disposed inside said container (10,10a,10b,10c), said id-tag/sensor being capable of retaining identification information and measuring physical or chemical parameters of said interior space, and at least one antenna (14,14a,16, 16a,22,22a,24) being associated with said id-tag/sensor, wherein said antenna comprises at least two loops of wire (14,14a,16,16a), a first said wire (16,16a) being disposed on said inside in the proximity of the impenetrable material (18) of said container (10) and said id-tag/sensor(12), and a second said wire (14,14a) being disposed on said outside around said container (10).

8. The container of claim 7 wherein said first wire (16a) is inside said container (10).

9. The container of claim 7 wherein said first wire (16) is outside said container (10).

10. The container of claim 7 wherein said first wire (16,16a) is used as a receiving antenna and said second wire (14,14a) is used as a transmitting antenna for said id-tag/sensor (12), and said id-tag/sensor (12) is activated by communication means associated with said transmitting antenna.

11. The container of claim 7 wherein said sensor (26) is in proximity to and coupled to a loop of wire (22) disposed in the proximity of said impenetrable material (18a) of said container (10a), and said loop of wire (22) is inductively associated with an antenna (24) outside said container (10a).

12. The container of claim 11 wherein said impenetrable material (18a) of said container (10a) is a nonmetal.

13. The container of claim 7 wherein said id-tag/sensor (36) comprises a chip sandwiched between an upper electrode (15) and a ground electrode (30) wherein said id-tag/sensor (36) is activated by at least two electric field (E-field) plates (44,46) at opposed sides of said id-tag/sensor (36), wherein a first E-field plate comprises a metal core (54) in the interior of said container (10c), and a second E-field plate comprises the impenetrable material (18c) of said container (10c).

* * * * *